(12) United States Patent
Brunot et al.

(10) Patent No.: US 12,462,698 B2
(45) Date of Patent: Nov. 4, 2025

(54) DEVICE AND SYSTEM FOR ESTIMATING THE POSITION AND SPEED OF AN AIRCRAFT DURING AN APPROACH PHASE ALLOWING AUTOMATIC LANDING

(71) Applicant: Airbus Operations SAS, Toulouse (FR)

(72) Inventors: Mathieu Brunot, Toulouse (FR); Cédric Brunet, Toulouse (FR); Damien Gonzalez-Conde, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 68 days.

(21) Appl. No.: 18/603,673

(22) Filed: Mar. 13, 2024

(65) Prior Publication Data

US 2024/0331555 A1   Oct. 3, 2024

(30) Foreign Application Priority Data

Mar. 30, 2023 (FR) ..................................... 2303061

(51) Int. Cl.
*G08G 5/54* (2025.01)
*G01S 5/02* (2010.01)
*G08G 5/26* (2025.01)

(52) U.S. Cl.
CPC .............. *G08G 5/54* (2025.01); *G01S 5/0263* (2013.01); *G01S 5/0294* (2013.01); *G08G 5/26* (2025.01); *G01S 2205/03* (2020.05)

(58) Field of Classification Search
CPC ... G08G 5/54; G08G 5/26; G08G 5/21; G01S 5/0263; G01S 5/0294; G01S 2205/03;
(Continued)

(56) References Cited

U.S. PATENT DOCUMENTS 6,178,363 B1 * 1/2001 McIntyre ................ G01S 19/52
701/16
9,098,999 B2 * 8/2015 Snow ....................... G08G 5/21
(Continued)

FOREIGN PATENT DOCUMENTS

EP        3327534 B1    12/2020
FR        3111710 A1    12/2021
KR    101715336 B1 *     3/2017    ........... G01S 19/396

OTHER PUBLICATIONS

French Search Report for corresponding French Patent Application No. 2303061 dated Nov. 14, 2023.

*Primary Examiner* — Muhammad Shafi
(74) *Attorney, Agent, or Firm* — Greer, Burns & Crain, Ltd.

(57) ABSTRACT

An estimation device for estimating, during an aircraft approach procedure for landing on a runway following a predefined runway approach, a deviation relative to a reference guidance axis corresponding to the predefined runway approach, and a speed of an aircraft relative to the runway, the approach procedure being carried out with a landing aid device including at least one transmitter station configured to transmit the reference guidance signal defining the reference guidance axis. The estimation device includes an acquisition unit for a current aircraft position of a geo-positioning system, an acquisition unit for a current acceleration of an inertial unit, an acquisition unit for a current lateral and vertical deviation of a landing aid device, a filtering unit for estimating an unbiased aircraft speed, a filtering unit for estimating a current lateral deviation, a current vertical deviation as well as current lateral and vertical speeds of the aircraft.

8 Claims, 4 Drawing Sheets

(58) Field of Classification Search
CPC . G01S 1/14; G01S 19/47; G01S 19/15; G01S 19/49; G05D 1/46; G05D 2105/22; G05D 1/247; G05D 2107/13; G05D 2109/22; G05D 2111/30; G05D 1/646; G05D 1/6545; G01C 21/20; G01C 21/005; G01C 21/165
USPC .......................................................... 701/16
See application file for complete search history.

(56) References Cited

U.S. PATENT DOCUMENTS

| | | | | |
|---|---|---|---|---|
| 2004/0199304 | A1* | 10/2004 | Tatham | G05D 1/0676 |
| | | | | 701/16 |
| 2015/0081143 | A1* | 3/2015 | Snow | G08G 5/54 |
| | | | | 701/16 |
| 2017/0032684 | A1* | 2/2017 | Guignard | G05D 1/0676 |
| 2018/0024237 | A1* | 1/2018 | Laplace | G06V 20/588 |
| | | | | 701/16 |
| 2018/0374369 | A1* | 12/2018 | McLees | G01S 19/15 |
| 2020/0184835 | A1* | 6/2020 | Mere | G08G 5/54 |
| 2021/0396545 | A1* | 12/2021 | Alcalay | G01S 5/0244 |
| 2021/0398435 | A1* | 12/2021 | Alcalay | G01C 21/20 |
| 2022/0139240 | A1* | 5/2022 | Marconnet | G08G 5/26 |
| | | | | 701/17 |

\* cited by examiner

DEVICE AND SYSTEM FOR ESTIMATING THE POSITION AND SPEED OF AN AIRCRAFT DURING AN APPROACH PHASE ALLOWING AUTOMATIC LANDING

CROSS-REFERENCES TO RELATED APPLICATIONS

This application claims the benefit of the French patent application No. 2303061 filed on Mar. 30, 2023, the entire disclosures of which are incorporated herein by way of reference.

FIELD OF THE INVENTION

The present invention relates to a method and a device for estimating a position and a speed of an aircraft during an approach phase allowing automatic landing.

BACKGROUND OF THE INVENTION

Automatically landing an aircraft on a landing runway imposes severe constraints in terms of the implementation of the navigation systems of the aircraft.

Each landing runway at an airport generally has one or more predefined approaches, published on aeronautical maps. Each approach has a corresponding reference approach path, which is notably characterized by a reference approach axis for the considered landing runway. This reference approach axis can be defined by a lateral component and a vertical component. The lateral component is generally aligned with a longitudinal axis of the landing runway. The vertical component of the approach axis generally forms an angle of 3° with the landing runway.

During an approach phase to a runway at an airport, following a predefined approach to the runway, an aircraft can be guided to land on the runway by means of a radio navigation system. This radio navigation system can correspond to an Instrument Landing System (ILS). The radio navigation system comprises at least one ground-based transmitter station that is configured to transmit guidance signals that allow the aircraft to approach the approach axis corresponding to the predefined approach. These signals notably include a lateral guidance signal allowing the aircraft to know its lateral deviation from the reference approach path (deviation from the lateral component of the approach axis). This lateral guidance signal is generally called "Localizer signal". There is also a vertical guidance signal that allows the aircraft to know its vertical deviation from the reference approach path (deviation from the vertical component of the approach axis). This vertical guidance signal is generally called "Glide signal" or "Glide Slope signal".

Several approach and landing procedures, called CAT I, CAT II and CAT III, exist that use an ILS system. The CAT III category further comprises the CAT IIIa, CAT IIIb and CAT IIIc categories and allows automatic landing potentially without any decision height for the pilot of the aircraft. The CAT I category corresponds to a procedure that allows the aircraft to automatically descend to a decision height of 200 feet (61 m) provided that the Runway Visual Range (RVR) is sufficient.

At present, only the CAT II and CAT III categories (and associated CAT II/III ILS installations) meet the necessary requirements (mainly accuracy and integrity) for carrying out a full automatic landing until touchdown.

The CAT I category does not currently allow such an automatic landing to be carried out.

SUMMARY OF THE INVENTION

An aim of the present invention is to overcome the problem by proposing a method and a device for using a CAT I type ILS installation for automatic landing operations.

To this end, it relates to a method for estimating, during an approach procedure for an aircraft with a view to landing on a landing runway following a predefined approach to the landing runway, a deviation relative to a reference guidance axis corresponding to the predefined approach to the landing runway, and a speed of an aircraft relative to the landing runway, the approach procedure being carried out with the assistance of a landing aid device, the landing aid device comprising at least one transmitter station configured to transmit at least one reference guidance signal defining the reference guidance axis.

According to the invention, the method comprises at least the following iteratively repeated steps:

a first acquisition step, implemented by a first acquisition unit, for acquiring at least one current position of the aircraft determined by a geo-positioning system;

a second acquisition step, implemented by a second acquisition unit, for acquiring current inertial data of the aircraft in an inertial reference frame, including at least one current acceleration determined by an inertial unit;

a third acquisition step, implemented by a third acquisition unit, for acquiring a current lateral deviation and a current vertical deviation from the one or more reference guidance signals transmitted by the landing aid device;

a first filtering step, implemented by a first filtering unit, for estimating, using an extended Kalman filter, an unbiased speed of the aircraft in the inertial reference frame from at least the current position of the aircraft acquired in the first acquisition step and the current inertial data of the aircraft acquired in the second acquisition step;

a first reference frame changing step, which step is implemented by a first reference frame changing unit, for determining the unbiased speed of the aircraft in a reference frame linked to the landing runway from the unbiased speed in the inertial reference frame estimated in the first filtering step;

a second reference frame changing step, which step is implemented by a second reference frame changing unit, for determining the current position of the aircraft in the reference frame linked to the landing runway from the current position acquired in the first acquisition step and from information concerning the location of the landing runway originating from a database;

a second filtering step, implemented by a second filtering unit, for estimating, using at least one extended Kalman filter, a lateral position and a vertical position of the aircraft in the reference frame linked to the landing runway, from the current lateral deviation, the current vertical deviation, the unbiased speed in the reference frame linked to the landing runway and from the current position of the aircraft in the reference frame linked to the landing runway determined in the second reference frame changing step;

a determination step, implemented by a determination unit, for determining the current lateral deviation and the current vertical deviation of the aircraft in the reference frame linked to the landing runway, as well as the current lateral speed and the current vertical speed of the aircraft in the reference frame linked to the landing runway estimated in the second filtering step from the lateral position and the vertical position of the aircraft, as well as from the estimated unbiased speed in the inertial reference frame;

a transmission step, implemented by a transmission unit, for sending a user device the current lateral deviation and the current vertical deviation of the aircraft in the reference frame linked to the landing runway, as well as the current lateral speed and the current vertical speed of the aircraft in the reference frame linked to the landing runway.

Thus, by virtue of the filtering units, sufficient accuracy is obtained for the current lateral deviation, for the current vertical deviation of the aircraft in the reference frame linked to the landing runway, as well as for the current lateral speed and the current vertical speed of the aircraft in the reference frame linked to the landing runway for an automatic landing.

In addition, the extended Kalman filter of the first filtering step has:

a state vector comprising the estimated unbiased speed of the aircraft in the inertial reference frame, the estimated position of the aircraft and an acceleration bias in the inertial reference frame;

a measurement vector comprising a position of the aircraft determined by the geo-positioning system in the first acquisition step;

the first filtering step comprising an updating sub-step implemented by an updating unit for updating the estimated position using the current position of the aircraft determined by the geo-positioning system in the first acquisition step, the extended Kalman filter of the first filtering step also having a dynamic evolution model comprising the following equations:

$$dV_n/dt = a_n - 2\Omega_e V_e \sin(lat) + \frac{V_n V_Z}{M(lat) + h} - \frac{V_e^2 \tan(lat)}{N(lat) + h}$$

$$dV_e/dt = a_e + 2\Omega_e(V_n \sin(lat) + V_Z \cos(lat)) + \frac{V_e}{N(lat) + h}(V_Z + V_n \tan(lat))$$

$$dV_d/dt = a_Z - 2\Omega_e V_e \cos(lat) - \frac{V_n^2}{M(lat) + h} - \frac{V_e^2}{N(lat) + h} - g_D$$

$$dlat/dt = \frac{V_n}{M(lat) + h}$$

$$dlon/dt = \frac{V_e}{(N(lat) + h)\cos(lat)}$$

$$dh/dt = -V_d$$

$$dba_n/dt = dba_e/dt = dba_Z/dt = 0;$$

and an observation model comprising the following equations:

$$lat^{GNSS} = lat + v_{lat,GNSS}$$

$$lon^{GNSS} = lon + v_{lon,GNSS}$$

$$h^{GNSS} = h + v_{h,GNSS},$$

in which:

$\Omega_e$ corresponds to the rotation speed of the earth;

M corresponds to the meridian radius of curvature;

N corresponds to the radius of curvature of the first vertical of the earth;

$g_d$ corresponds to the gravitational acceleration;

lat corresponds to an estimated latitude coordinate of the position of the aircraft in the geographical reference frame;

lon corresponds to an estimated longitude coordinate of the position of the aircraft in the geographical reference frame;

h corresponds to an estimated height coordinate of the position of the aircraft in the geographical reference frame;

$lat^{GNSS}$ corresponds to a latitude coordinate of the position of the aircraft measured by the geo-positioning system in the geographical reference frame;

$lon^{GNSS}$ corresponds to a longitude coordinate of the position of the aircraft measured by the geo-positioning system in the geographical reference frame;

$h^{GNSS}$ corresponds to a height coordinate of the position of the aircraft measured by the geo-positioning system in the geographical reference frame;

$v_{lat,GNSS}$ corresponds to a white noise from the latitude coordinate measured by the geo-positioning system in the geographical reference frame;

$v_{lon,GNSS}$ corresponds to a white noise from the measurement of the longitude coordinate measured by the geo-positioning system in the geographical reference frame;

$v_{h,GNSS}$ corresponds to a white noise from the measurement of the height coordinate measured by the geo-positioning system in the geographical reference frame;

$a_n$ corresponds to a coordinate of the current acceleration of the aircraft in a Northern direction in the inertial reference frame;

$a_e$ corresponds to a coordinate of the current acceleration of the aircraft in an Eastward direction in the inertial reference frame;

$a_z$ corresponds to a coordinate of the current acceleration of the aircraft in a terrestrial gravity direction in the inertial reference frame;

$ba_n$ corresponds to a coordinate of the bias of the current acceleration of the aircraft in a Northern direction in the inertial reference frame;

$ba_e$ corresponds to a coordinate of the bias of the current acceleration of the aircraft in an Eastward direction in the inertial reference frame;

$ba_z$ corresponds to a coordinate of the bias of the current acceleration of the aircraft in a terrestrial gravity direction in the inertial reference frame;

$V_n$ corresponds to a coordinate of the unbiased speed of the aircraft in a Northern direction in the inertial reference frame;

$V_e$ corresponds to a coordinate of the unbiased speed of the aircraft in an Eastward direction in the inertial reference frame;

$V_z$ corresponds to a coordinate of the unbiased speed of the aircraft in a terrestrial gravity direction in the inertial reference frame.

According to a first embodiment, the current position of the aircraft determined by the geo-positioning system and the estimated position of the aircraft from the state vector of the extended Kalman filter of the first filtering step are defined in the geographical reference frame.

In addition, the second filtering step implements a first extended Kalman filter and a second extended Kalman filter, the first extended Kalman filter having:
a state vector comprising a lateral position of the aircraft in the reference frame linked to the landing runway, an angular alignment bias of a lateral guidance signal supplied by the landing aid device and a sensitivity factor bias of the lateral guidance signal;
a measurement vector comprising the lateral position in the reference frame linked to the landing runway and a current lateral deviation measured in microamperes from the lateral guidance signal;
the second extended Kalman filter having:
a state vector comprising a vertical position in the reference frame linked to the landing runway, an angular alignment bias of a vertical guidance signal supplied by the landing aid device and a sensitivity factor bias of the vertical guidance signal;
a measurement vector comprising the vertical position in the reference frame linked to the landing runway and a current vertical deviation measured in DDM from the vertical guidance signal;
the second filtering step comprising a first updating sub-step implemented by a first updating unit for updating the lateral position of the aircraft estimated by the first extended Kalman filter in the reference frame linked to the landing runway using the current position of the aircraft in the reference frame linked to the landing runway determined in the second reference frame changing step;
the second filtering step comprises a second updating sub-step implemented by a second updating unit for updating the vertical position of the aircraft estimated by the first extended Kalman filter in the reference frame linked to the landing runway using the current vertical position of the aircraft in the reference frame linked to the landing runway determined in the second reference frame changing step;
the first extended Kalman filter implemented in the second filtering step having a dynamic evolution model comprising the following equations:

$$dY_{rwy}/dt = V_{y_{rwy}}$$

$$db_{LOC_{Sensi}}/dt = db_{Align}/dt = 0,$$

and an observation model comprising the following equation:

$$\eta_{loc} = \frac{L}{0.7 + b_{LOC_{Sensi}}} \cdot \frac{Y_{rwy} - \sin(b_{Align}) \cdot (L - X_{rwy})}{L - X_{rwy}} + v_{loc},$$

in which:
$\eta_{loc}$ corresponds to a current lateral deviation in microamperes acquired from the one or more reference guidance signals transmitted by the landing aid device;
$v_{loc}$ corresponds to a measurement noise of the current lateral deviation;
L corresponds to a distance between the threshold of the landing runway and the transmitter station that transmits the reference lateral guidance signal;
$b_{LOC_{Sensi}}$ corresponds to a sensitivity factor bias of the reference lateral guidance signal relative to a standardized reference lateral signal of 0.7;

$b_{Align}$ corresponds to the angular alignment bias of the lateral guidance signal;
$X_{rwy}$ corresponds to a longitudinal position of the aircraft in the reference frame linked to the landing runway;
$Y_{rwy}$ corresponds to a lateral position of the aircraft in the reference frame linked to the landing runway;
$V_{y_{rwy}}$ corresponds to an unbiased lateral speed of the aircraft in the reference frame linked to the landing runway;
the second extended Kalman filter implemented in the second filtering step having a dynamic evolution model comprising the following equations:

$$dZ_{rwy}/dt = V_{Z_{rwy}}$$

$$db_{GLD_{Sensi}}/dt = db_{GPA}/dt = 0,$$

and an observation model comprising the following equation:

$$\eta_{GLD} = \frac{0.0875}{(GPA - b_{GPA}) \cdot (0.12 - b_{GLD_{Sensi}})} \cdot \left(\text{atan}\left(\frac{Zrwy}{X_{rwy} + dX}\right) - (GPA - b_{GPA})\right) + v_{GLD},$$

in which:
$\eta_{GLD}$ corresponds to a current vertical deviation in DDM acquired from the one or more reference guidance signals transmitted by the landing aid device;
$v_{GLD}$ corresponds to a measurement noise of the current vertical deviation; $b_{GLD_{Sensi}}$ corresponds to a sensitivity factor bias of the reference vertical guidance signal relative to a standardized vertical guidance signal of 0.12;
GPA corresponds to an angle between the vertical guidance axis defined by the vertical guidance signal and the landing runway;
$b_{GPA}$ corresponds to the angular alignment bias of the vertical guidance signal;
$v_{GLD}$ corresponds to a measurement noise of the current vertical deviation;
dX corresponds to a longitudinal distance between the threshold of the landing runway and the transmitter station that transmits the reference vertical guidance signal;
$Z_{rwy}$ corresponds to the vertical position of the aircraft in the reference frame linked to the landing runway;
$V_{z_{rwy}}$ corresponds to an unbiased vertical speed of the aircraft in the reference frame linked to the landing runway.

Furthermore, the current lateral deviation is equal to the lateral position of the aircraft estimated by the first extended Kalman filter in the reference frame linked to the landing runway, the current lateral speed is equal to the lateral speed estimated by the first extended Kalman filter in the reference frame linked to the landing runway,
and the current vertical deviation of the aircraft complies with the following expression:

$$DZ = Z_{rwy} - (X_{rwy} + dX) \cdot \tan(GPA - b_{GPA}),$$

with the current vertical speed of the aircraft complying with the following expression:

$$DVZ = V_g \cdot \tan(GPA - b_{GPA}) - V_{Z_{rwy}}. \quad (5)$$

According to a second embodiment, the current position of the aircraft determined by the geo-positioning system and the estimated position of the aircraft from the state vector of the extended Kalman filter of the first filtering step are expressed as pseudo-range.

The invention also relates to a device for estimating, during an approach procedure for an aircraft with a view to landing on a landing runway following a predefined approach to the landing runway, a deviation relative to a reference guidance axis corresponding to the predefined approach to the landing runway, and a speed of an aircraft relative to the landing runway, the approach procedure being carried out with the assistance of a landing aid device, the landing aid device comprising at least one transmitter station configured to transmit a reference guidance signal defining the reference guidance axis.

According to the invention, the device comprises at least:
- a first acquisition unit configured to acquire at least one current position of the aircraft determined by a geo-positioning system;
- a second acquisition unit configured to acquire current inertial data of the aircraft in an inertial reference frame, including at least one current acceleration determined by an inertial unit;
- a third acquisition unit configured to acquire a current lateral deviation and a current vertical deviation from the one or more reference guidance signals transmitted by the landing aid device;
- a first filtering unit configured to estimate, using an extended Kalman filter, an unbiased speed of the aircraft in the inertial reference frame from at least the current position of the aircraft acquired by the first acquisition unit and the current inertial data of the aircraft acquired by the second acquisition unit;
- a first reference frame changing unit configured to determine the unbiased speed of the aircraft in a reference frame linked to the landing runway from the unbiased speed in the inertial reference frame estimated by the first filtering unit;
- a second reference frame changing unit configured to determine the current position of the aircraft in the reference frame linked to the landing runway from the current position acquired by the first acquisition unit and from information concerning the location of the landing runway originating from a database;
- a second filtering unit configured to estimate, using at least one extended Kalman filter, a lateral position and a vertical position of the aircraft in the reference frame linked to the landing runway, from the current lateral deviation, the current vertical deviation, the unbiased speed in the reference frame linked to the landing runway and from the current position of the aircraft in the reference frame linked to the landing runway determined by the second reference frame changing unit;
- a determination unit configured to determine the current lateral deviation and the current vertical deviation of the aircraft in the reference frame linked to the landing runway, as well as the current lateral speed and the current vertical speed of the aircraft in the reference frame linked to the landing runway estimated by the second filtering unit from the lateral position and the vertical position of the aircraft, as well as from the estimated unbiased speed in the inertial reference frame;
- a transmission unit configured to send a user device the current lateral deviation and the current vertical deviation of the aircraft in the reference frame linked to the landing runway, as well as the current lateral speed and the current vertical speed of the aircraft in the reference frame linked to the landing runway.

The invention also relates to an aircraft comprising an estimation device, such as that specified above.

BRIEF DESCRIPTION OF THE DRAWINGS

The attached figures will demonstrate how the invention can be implemented. Throughout these figures, identical reference signs designate similar elements.

DETAILED DESCRIPTION OF THE PREFERRED EMBODIMENTS

Figure 1:
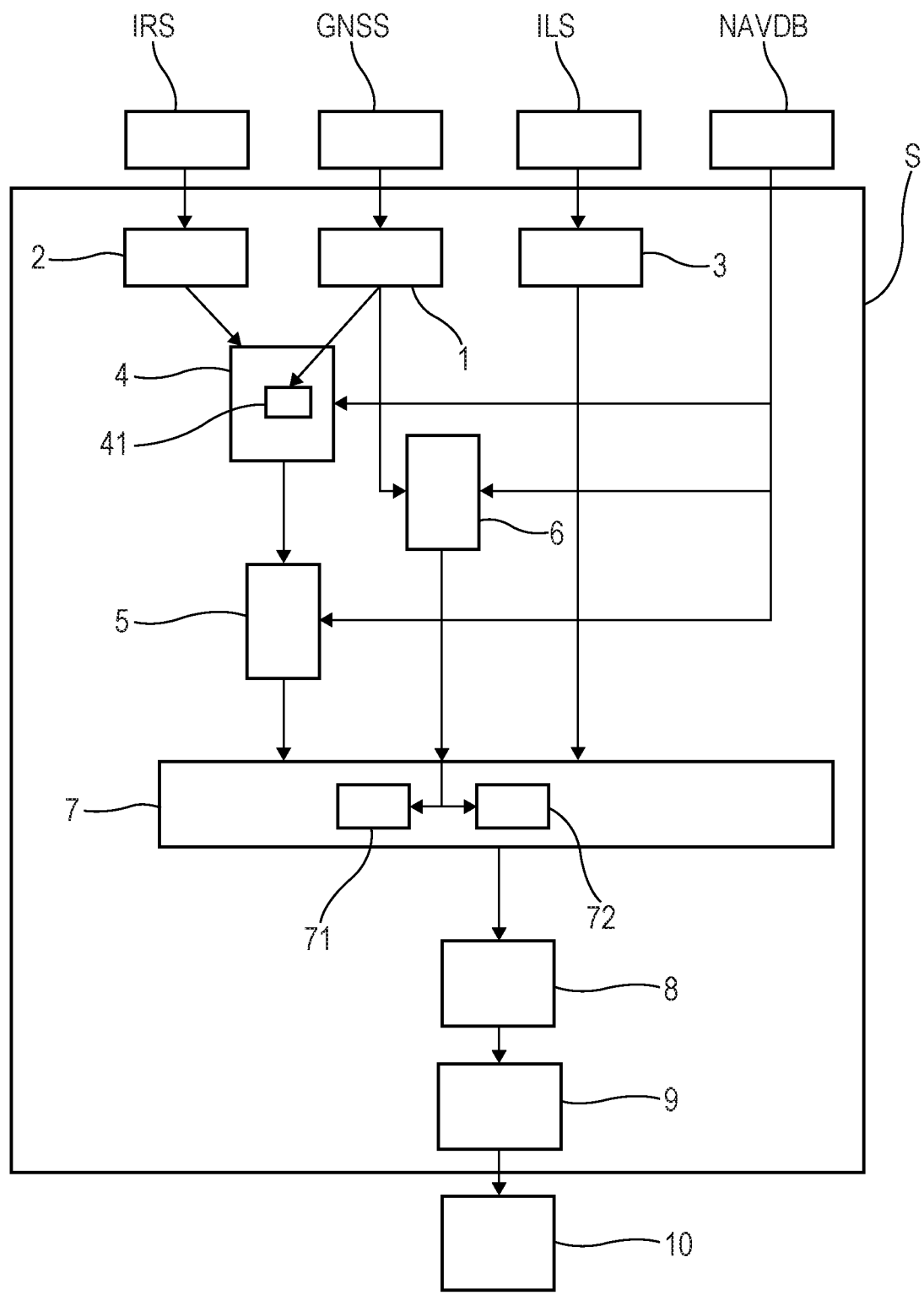
FIG. 1 shows a schematic view of the estimation device.
Figure 3:
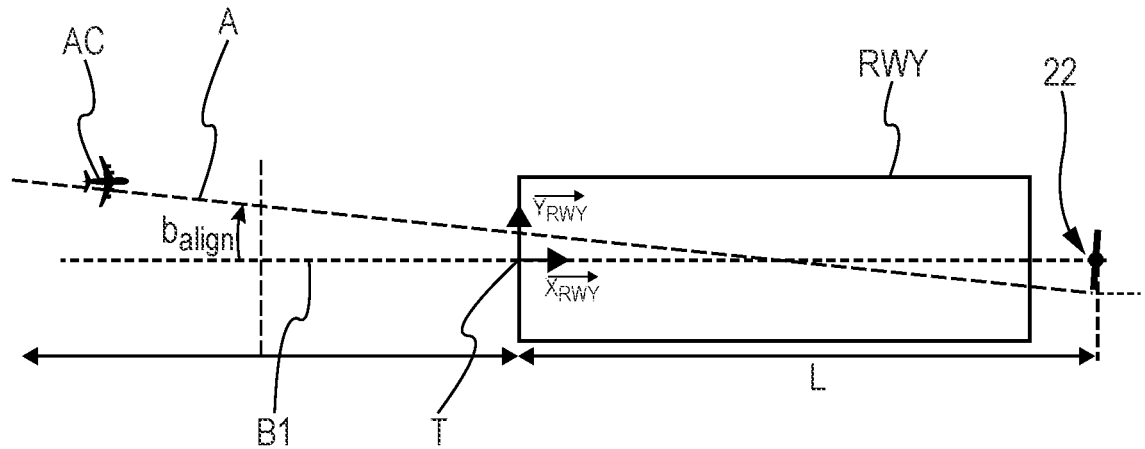
FIG. 3 shows a top view of an aircraft during an approach procedure with a view to landing on a landing runway.

FIG. 1 shows the device S for estimating a deviation DY, DZ relative to a reference guidance axis A and a speed DVY, DVZ of an aircraft AC relative to a landing runway RWY during an approach procedure for an aircraft AC with a view to landing on the landing runway RWY following a predefined approach to the landing runway RWY. The reference guidance axis A corresponds to a predefined approach to the landing runway RWY (FIG. 3).

Throughout the remainder of the description, the device is called "estimation device S".

The landing runway RWY defines a reference frame in which the origin of the reference frame corresponds to a threshold T of the landing runway RWY, the abscissa axis of the reference frame is based on a unit vector parallel to the longitudinal axis B1 of the landing runway RWY, the ordinate axis is based on a unit vector perpendicular to the longitudinal axis B1 of the landing runway and the coordinate axis is based on a unit vector perpendicular to the plane comprising the abscissa axis and the ordinate axis. Throughout the remainder of the description, this reference frame is called "reference frame linked to the landing runway RWY".

The estimation device S can be integrated into flight control computers on board the aircraft AC in software form.

The approach procedure is carried out with the assistance of a landing aid device, such as an ILS system. The landing aid device comprises at least one transmitter station 22 configured to transmit a reference guidance signal defining the reference guidance axis A.

A transmitter station transmits a lateral reference guidance signal corresponding to a "Localizer signal" type signal. Another transmitter station transmits a reference vertical guidance signal corresponding to a "Glide Slope signal" type signal. The reference lateral guidance signal defines the lateral component of the reference guidance axis A. The reference vertical guidance signal defines the vertical component of the reference guidance axis A.

The estimation device S comprises at least:
a first acquisition unit 1;
a second acquisition unit 2;
a third acquisition unit 3;
a first filtering unit 4;
a first reference frame changing unit 5;
a second reference frame changing unit 6;
a second filtering unit 7;
a determination unit 8;
a transmission unit 9.

The first acquisition unit 1 is configured to acquire at least one current position ($lat^{GNSS}$, $lon^{GNSS}$, $h^{GNSS}$) of the aircraft AC that is determined by a GNSS geo-positioning system.

The geo-positioning system can correspond to a Global Navigation Satellite System (GNSS) geolocation and navigation system, such as a Global Positioning System (GPS).

For example, the GPS system can be used with a Satellite-Based Augmentation System (SBAS). This variant allows a more accurate current position ($lat^{GNSS}$, $lon^{GNSS}$, $h^{GNSS}$) of the aircraft AC to be obtained.

In other examples, the GPS system can be replaced by a Galileo, Glonass or BeiDou system.

In a first embodiment, the current position ($lat^{GNSS}$, $lon^{GNSS}$, $h^{GNSS}$) of the aircraft AC can be determined by the geo-positioning system GNSS in a geographical reference frame. In the geographical reference frame, the current position ($lat^{GNSS}$, $lon^{GNSS}$, $h^{GNSS}$) is defined by a latitude coordinate $lat^{GNSS}$ (in degrees), a longitude coordinate $lon^{GNSS}$ (in degrees) and a height coordinate $h^{GNSS}$ (in meters).

In a second embodiment, the current position of the aircraft AC determined by the geo-positioning system GNSS is expressed as pseudo-range. A pseudo-range corresponds to an indirect distance value between a transmitter satellite of the geo-positioning system and the geo-positioning system GNSS by comparing the time of reception of a signal received by the geo-positioning system GNSS and the time of transmission of the signal by the transmitter satellite, without taking into account the synchronization of the clocks of the geo-positioning system GNSS and of the transmitter satellite.

The second acquisition unit 2 is configured to acquire current inertial data from the aircraft AC in an inertial reference frame, including at least one current acceleration ($a_n$, $a_e$, $a_z$) determined by an IRS (Inertial Reference System) inertial unit on board the aircraft AC.

The inertial reference frame corresponds to a North-East-Down (NED) reference frame. The NED reference frame is defined from a plane tangent to the surface of the earth. The NED reference frame comprises a unit vector on the abscissa coinciding with the Northern direction, a unit vector on the ordinate coinciding with the Eastern direction and a unit vector on the coordinate coinciding with the direction of gravity. The origin of this reference frame is selected so that it coincides with the center of gravity of the aircraft.

For the current acceleration ($a_n$, $a_e$, $a_z$), the coordinate an (in m/s2) is based on the unit vector coinciding with the Northern direction. The coordinate de (in m/s2) is based on the unit vector coinciding with the Eastern direction. The coordinate $a_z$ (in m/s2) is based on the unit vector coinciding with the direction of gravity.

The third acquisition unit 3 is configured to acquire a current lateral deviation $\eta_{LOC}$ and a current vertical deviation $\eta_{GLD}$ from the one or more reference guidance signals transmitted by the landing aid device 22.

The current lateral deviation $\eta_{LOC}$ is determined from the reference lateral signal defining the lateral component of the reference guidance axis A.

The current vertical deviation $\eta_{GLD}$ is determined from the reference vertical guidance signal defining the vertical component of the reference guidance axis A.

The first filtering unit 4 is configured to estimate, using an extended Kalman filter, an unbiased speed ($V_n$, $V_e$, $V_d$) of the aircraft AC in the inertial reference frame from at least the current position ($lat^{GNSS}$, $lon^{GNSS}$, $h^{GNSS}$) of the aircraft AC acquired by the first acquisition unit 1 and from the current inertial data of the aircraft AC acquired by the second acquisition unit 2.

In the inertial reference frame, the coordinate $V_n$ (in m/s) is based on the unit vector coinciding with the Northern direction. The coordinate Ve (in m/s) is based on the unit vector coinciding with the Eastern direction. The coordinate $V_z$ (in m/s) is based on the unit vector coinciding with the terrestrial gravity direction.

The extended Kalman filter of the first filtering unit 4 can have a state vector comprising the estimated unbiased speed ($V_n$, $V_e$, $V_d$) of the aircraft AC in the inertial reference frame, the estimated position (lat, lon, h) of the aircraft AC and an acceleration bias ($ba_n$, $ba_e$, $ba_z$) in the inertial reference frame.

In the geographical reference frame, the estimated position (lat, lon, h) of the aircraft AC is therefore defined by a latitude coordinate lat (in degrees), a longitude coordinate lon (in degrees) and a height coordinate h (in meters) (or altitude).

In the inertial reference frame, the current acceleration bias ($ba_n$, $ba_e$, $ba_z$) is defined by a coordinate ban (en m/s2) in a Northern direction, a coordinate $ba_e$ (en m/s2) in an Eastern direction and a coordinate $ba_z$ (in m/s2) in a terrestrial gravity direction.

According to the first embodiment, the estimated position (lat, lon, h) of the aircraft AC from the state vector of the extended Kalman filter of the first filtering step E4 is defined in the geographical reference frame.

Throughout the remainder of the description of the estimation device S, the current position ($lat^{GNSS}$, $lon^{GNSS}$, $h^{GNSS}$) of the aircraft AC and the estimated position (lat, lon, h) of the aircraft AC are defined in the geographical reference frame.

The extended Kalman filter of the first filtering unit 4 can also have a measurement vector comprising a position ($lat^{GNSS}$, $lon^{GNSS}$, $h^{GNSS}$) of the aircraft AC determined by the geo-positioning system GNSS in the first acquisition step E1. The first filtering step E4 can comprise an updating sub-step E41 for updating the estimated position (lat, lon, h) using the current position ($lat^{GNSS}$, $lon^{GNSS}$, $h^{GNSS}$) of the aircraft AC determined by the geo-positioning system GNSS in the first acquisition step E1.

In addition, the extended Kalman filter of the first filtering unit 4 can implement an evolution model comprising the following equations:

$$dV_n/dt = a_n - 2\Omega_e V_e \sin(lat) + \frac{V_n V_z}{M(lat)+h} - \frac{V_e^2 \tan(lat)}{N(lat)+h}$$

$$dV_e/dt = a_e + 2\Omega_e(V_n \sin(lat) + V_z \cos(lat)) + \frac{V_e}{N(lat)+h}(V_z + V_n \tan(lat))$$

$$dV_d/dt = a_z - 2\Omega_e V_e \cos(lat) - \frac{V_n^2}{M(lat)+h} - \frac{V_e^2}{N(lat)+h} - g_d$$

$$dlat/dt = \frac{V_n}{M(lat)+h}$$

-continued $$dlon/dt = \frac{V_e}{(N(lat)+h)\cos(lat)}$$

$$dh/dt = -V_d$$

$$dba_n/dt = dba_e/dt = dba_Z/dt = 0;$$

and an observation model comprising the following equations:

$$lat^{GNSS} = lat + v_{lat,GNSS}$$

$$lon^{GNSS} = lon + v_{lon,GNSS}$$

$$h^{GNSS} = h + v_{h,GNSS},$$

in which:
$\Omega_e$ corresponds to the rotation speed of the earth (in rad/s);
M corresponds to the meridian radius of curvature (in meters);
N corresponds to the radius of curvature of the first vertical of the earth (in meters);
$g_d$ corresponds to the gravitational acceleration (in m/s2);
lat corresponds to an estimated latitude coordinate of the position of the aircraft AC in the geographical reference frame (in degrees);
lon corresponds to an estimated longitude coordinate of the position of the aircraft AC in the geographical reference frame (in degrees);
h corresponds to an estimated height coordinate of the position of the aircraft AC in the geographical reference frame (in degrees);
$lat^{GNSS}$ corresponds to a latitude coordinate of the position of the aircraft AC measured by the geo-positioning system GNSS in the geographical reference frame (in degrees);
$lon^{GNSS}$ corresponds to a longitude coordinate of the position of the aircraft AC measured by the geo-positioning system GNSS in the geographical reference frame (in degrees);
$h^{GNSS}$ corresponds to a height coordinate of the position of the aircraft AC measured by the geo-positioning system GNSS in the geographical reference frame (in degrees);
$v_{lat,GNSS}$ corresponds to a white noise from the measurement of the latitude coordinate lat (in degrees);
$v_{lon,GNSS}$ corresponds to a white noise from the measurement of the longitude coordinate lon (in degrees);
$v_{h,GNSS}$ corresponds to a white noise from the measurement of the height coordinate h (in degrees);
$a_n$ corresponds to a coordinate of the current acceleration of the aircraft AC in a Northern direction in the inertial reference frame;
$a_e$ corresponds to a coordinate of the current acceleration of the aircraft AC in an Eastward direction in the inertial reference frame;
$a_z$ corresponds to a coordinate of the current acceleration of the aircraft AC in a terrestrial gravity direction in the inertial reference frame;
$ba_n$ corresponds to a coordinate of the bias of the current acceleration of the aircraft AC in a Northern direction in the inertial reference frame;
$ba_e$ corresponds to a coordinate of the bias of the current acceleration of the aircraft AC in an Eastward direction in the inertial reference frame;
$ba_z$ corresponds to a coordinate of the bias of the current acceleration of the aircraft AC in a terrestrial gravity direction in the inertial reference frame;
$V_n$ corresponds to a coordinate of the unbiased speed of the aircraft AC in a Northern direction in the inertial reference frame (in m/s);
$V_e$ corresponds to a coordinate of the unbiased speed of the aircraft AC in an Eastward direction in the inertial reference frame (in m/s);
$V_z$ corresponds to a coordinate of the unbiased speed of the aircraft AC in a terrestrial gravity direction in the inertial reference frame (in m/s).

The first reference frame changing unit 5 is configured to determine the unbiased speed ($V_{x_{rwy}}$, $V_{y_{rwy}}$, $V_{z_{rwy}}$) of the aircraft AC in the reference frame linked to the landing runway RWY from the unbiased speed ($V_n$, $V_e$, $V_d$) in the inertial reference frame estimated by the first filtering unit 4.

Once the current position ($lat^{GNSS}$, $lon^{GNSS}$, $h^{GNSS}$) of the aircraft AC is estimated and the unbiased speed ($V_n$, $V_e$, $V_d$) in the inertial reference frame is estimated, the first reference frame changing unit 5 determines the unbiased speed ($V_{x_{rwy}}$, $V_{y_{rwy}}$, $V_{z_{rwy}}$) of the aircraft AC in the reference frame linked to the landing runway RWY using the following equations:

$$V_{x_{rwy}} = \cos(\psi_r)V_n + \sin(\psi_r)V_e$$

$$V_{y_{rwy}} = \sin(\psi_r)V_n - \cos(\psi_r)V_e$$

$$V_{z_{rwy}} = -V_d$$

in which:
$\psi_r$ corresponds to the runway heading (in rad) that corresponds to the orientation of the longitudinal axis B1 of the landing runway RWY relative to the Northern direction;
$V_{x_{rwy}}$ corresponds to the coordinate of the unbiased speed (in m/s) based on the unit vector parallel to the longitudinal axis B1 of the landing runway RWY (longitudinal unbiased speed);
$V_{y_{rwy}}$ corresponds to the coordinate of the unbiased speed (in m/s) based on the unit vector perpendicular to the longitudinal axis B1 of the landing runway RWY (lateral unbiased speed);
$V_{z_{rwy}}$ corresponds to the coordinate of the unbiased speed (in m/s) based on the unit vector perpendicular to the plane comprising the abscissa axis and the ordinate axis (vertical unbiased speed).

The orientation $\psi_r$ of the landing runway can be provided by a navigation database NAVDB.

The second reference frame changing unit 6 is configured to determine the current position ($X_{rwy}^{GNSS}$, $Y_{rwy}^{GNSS}$, $Z_{rwy}^{GNSS}$) of the aircraft AC in the reference frame linked to the landing runway RWY from the current position $lat^{GNSS}$, $lon^{GNSS}$ $h^{GNSS}$ acquired by the first acquisition unit 1 and from information concerning the location of the landing runway RWY originating from the database, such as the navigation database NAVDB.

The current position ($X_{rwy}^{GNSS}$, $Y_{rwy}^{GNSS}$, $Z_{rwy}^{GNSS}$) of the aircraft AC in the reference frame linked to the landing runway RWY comprises:
the coordinate $X_{rwy}^{GNSS}$ that corresponds to the coordinate of the current position (in meters) based on the unit vector parallel to the longitudinal axis B1 of the landing runway RWY (longitudinal position acquired by the first acquisition unit 1);

the coordinate $Y_{rwy}^{GNSS}$ that corresponds to the coordinate of the current position (in meters) based on the unit vector perpendicular to the longitudinal axis B1 of the landing runway RWY (lateral position acquired by the first acquisition unit 1);

the coordinate $Z_{rwy}^{GNSS}$ that corresponds to the coordinate of the current position (in meters) based on the unit vector perpendicular to the plane comprising the abscissa axis and the ordinate axis (vertical position acquired by the first acquisition unit 1).

The second filtering unit 7 is configured to estimate, using at least one extended Kalman filter, a lateral position $Y_{rwy}$ and a vertical position $Z_{rwy}$ of the aircraft AC in the reference frame linked to the landing runway RWY from the current lateral deviation $\eta_{LOC}$, the current vertical deviation $\eta_{GLD}$, the unbiased speed $(V_{x_{rwy}}, V_{y_{rwy}}, V_{z_{rwy}})$ in the reference frame linked to the landing runway RWY and the current position $(X_{rwy}^{GNSS}, Y_{rwy}^{GNSS}, Z_{rwy}^{GNSS})$ of the aircraft AC in the reference frame linked to the landing runway RWY determined by the second reference frame changing unit 6.

The second filtering unit 7 can implement a first extended Kalman filter and a second extended Kalman filter.

The first extended Kalman filter of the second filtering unit 7 can have a state vector comprising a lateral position $Y_{rwy}$ (in meters) of the aircraft AC in the reference frame linked to the landing runway RWY, an angular alignment bias $b_{Align}$ (in radians) of a lateral guidance signal supplied by the landing aid device and a sensitivity factor bias $b_{LOC_{Sensi}}$ of the lateral guidance signal.

The lateral position $Y_{rwy}$ corresponds to the coordinate of the position of the aircraft along the ordinate axis in the reference frame linked to the landing runway RWY.

The angular alignment bias $b_{Align}$ of the lateral guidance signal corresponds to an angular deviation of the lateral guidance signal (Localizer signal) that defines a lateral guidance axis relative to the lateral component of the reference approach axis corresponding to the longitudinal axis of the landing runway RWY. The longitudinal axis B1 of the landing runway RWY corresponds to an axis that separates the landing runway RWY into two substantially identical parts along the length of the landing runway RWY.

The first extended Kalman filter of the second filtering unit 7 can also have a measurement vector comprising the current lateral position $Y_{rwy}^{GNSS}$ (in meters) in the reference frame linked to the landing runway RWY and a current lateral deviation $\eta_{LOC}$ measured in microamperes or DDM from the reference lateral guidance signal and acquired by the third acquisition unit 3.

The current lateral deviation $\eta_{LOC}$ measured in DDM (Difference in the Depth of Modulation) means that it is measured by modulation rate difference. In practice, it is expressed as a percentage. The lateral guidance signal is made up of two parts. Each part is transmitted at a different frequency. The DDM corresponds to a difference between the modulation rate of one part transmitted at one frequency and the modulation rate of the other part transmitted at another frequency. The lateral deviation is zero if the aircraft AC follows a path aligned with the lateral guidance axis.

The first extended Kalman filter of the second filtering unit 7 that can be implemented in the second filtering unit 7 can implement an evolution model comprising the following equations:

$$dY_{rwy}/dt = V_{y_{rwy}}$$

$$db_{LOC_{Sensi}}/dt = db_{Align}/dt = 0,$$

and an observation model comprising the following equation:

$$\eta_{loc} = \frac{L}{0.7 + b_{LOC_{Sensi}}} \cdot \frac{Y_{rwy} - \sin(b_{Align}) \cdot (L - X_{rwy})}{L - X_{rwy}} + v_{loc},$$

in which:

$\eta_{loc}$ corresponds to a current lateral deviation acquired by the third acquisition unit 3 from the one or more reference guidance signals transmitted by the landing aid device 22;

$v_{loc}$ corresponds to a measurement noise (in microamperes) of the current lateral deviation;

L corresponds to a distance (in meters) between the threshold T of the landing runway RWY and the transmitter station that transmits the reference lateral guidance signal;

$b_{LOC_{Sensi}}$ corresponds to a sensitivity factor bias of the reference lateral guidance signal (Localizer) relative to a standardized reference lateral signal of 0.7;

The standardized sensitivity factor of 0.7 corresponds to a sensitivity factor that complies with International Civil Aviation Organization (ICAO) standards.

$b_{Align}$ corresponds to the angular alignment bias of the lateral guidance signal;

$X_{rwy}$ corresponds to the longitudinal position (in a direction parallel to the longitudinal axis of the landing runway RWY along the abscissa axis) of the aircraft AC in the reference frame linked to the landing runway RWY (in meters);

$Y_{rwy}$ corresponds to the lateral position of the aircraft AC in the reference frame linked to the landing runway RWY (in meters);

$V_{y_{rwy}}$ corresponds to an unbiased lateral speed of the aircraft AC in the reference frame linked to the landing runway RWY (in m/s).

The second extended Kalman filter of the second filtering unit 7 can have a state vector comprising a vertical position $Z_{rwy}$ (in meters) in the reference frame linked to the landing runway RWY, an angular alignment bias $b_{GPA}$ (in radians) of a vertical guidance signal supplied by the landing aid device and a sensitivity factor bias $b_{GLD_{Sensi}}$ of the vertical guidance signal.

The vertical position $Z_{rwy}$ corresponds to the coordinate of the position of the aircraft along the coordinate axis in the reference frame linked to the landing runway RWY.

Figure 4:
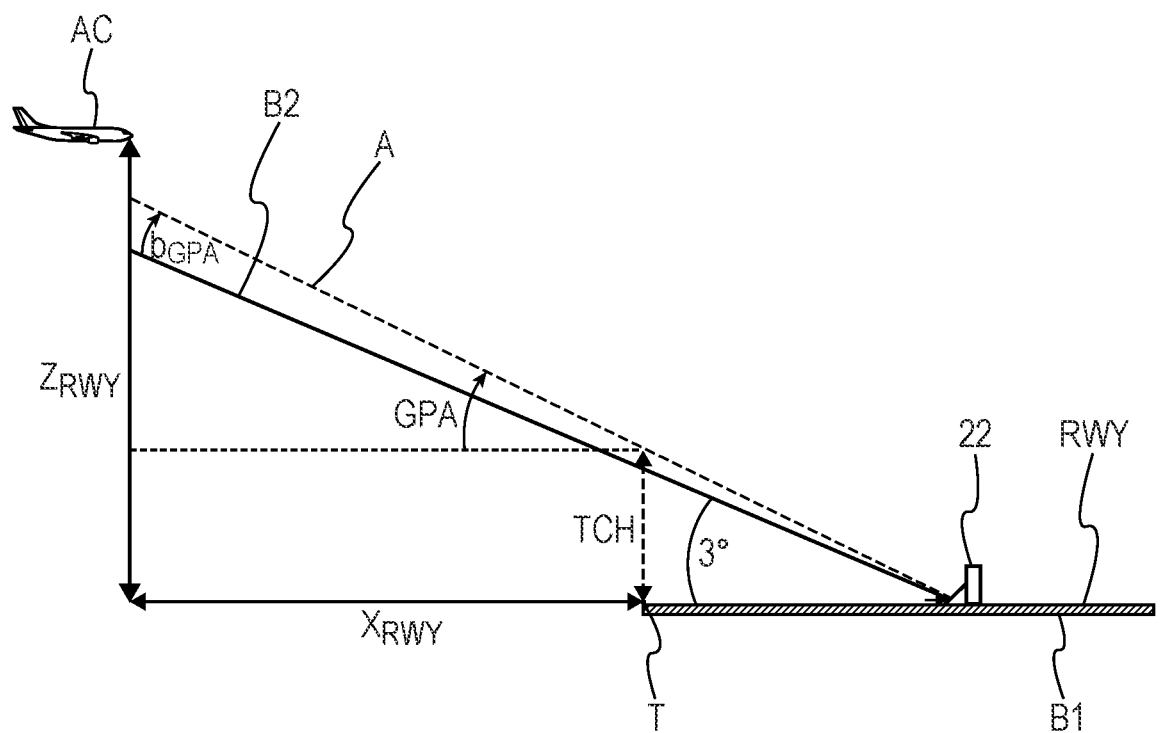
FIG. 4 shows a side view of an aircraft during an approach procedure with a view to landing on a landing runway.
Figure 5:
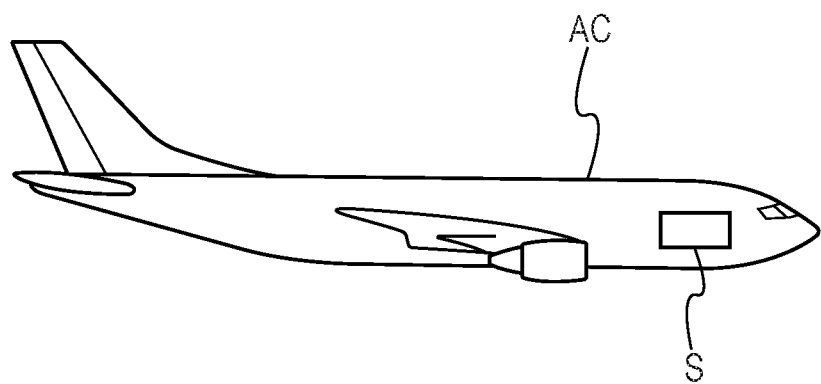
FIG. 5 shows a profile view of an aircraft fitted with the estimation device.

The angular alignment bias $b_{GPA}$ of the vertical guidance signal corresponds to an angular deviation of the vertical guidance signal (Glide Slope signal) that defines a vertical guidance axis A relative to the vertical component of the reference approach axis B2 forming a predetermined angle with the landing runway RWY. In a non-limiting manner, the predetermined angle is equal to 3° (FIG. 4). The predetermined angle can also be provided by the navigation database NAVDB.

The second extended Kalman filter of the second filtering unit 7 can also have a measurement vector comprising the vertical position $Z_{rwy}^{GNSS}$ of the aircraft in the reference frame linked to the landing runway RWY and a current vertical deviation $\eta_{GLD}$ measured in DDM or microamperes based on the reference vertical guidance signal.

The current vertical deviation $\eta_{GLD}$ measured in DDM (Difference in the Depth of Modulation), as for the current lateral deviation $\eta_{LOC}$, means that it is measured by modulation rate difference. The vertical guidance signal is made up of two parts. Each part is transmitted at a different frequency. The DDM corresponds to a difference between the modulation rate of one part transmitted at one frequency and the modulation rate of the other part transmitted at another frequency. The vertical deviation is zero if the aircraft AC follows a path aligned with the vertical guidance axis.

The second extended Kalman filter of the second filtering unit 7 that can be implemented in the second filtering unit 7 implements an evolution model comprising the following equations:

$$dZ_{rwy}/dt = v_{z_{rwy}}$$

$$db_{GLD_{Sensi}}/dt = db_{GPA}/dt = 0,$$

and an observation model comprising the following equation:

$$\eta_{GLD} = \frac{0.0875}{(GPA - b_{GPA}) \cdot (0.12 - b_{GLD_{Sensi}})} \cdot \left( \operatorname{atan}\left( \frac{Z_{rwy}}{X_{rwy} + dX} \right) - (GPA - b_{GPA}) \right) + v_{GLD},$$

in which:

$\eta_{GLD}$ corresponds to a current vertical deviation acquired (in DDM) by the third acquisition unit 3 from the one or more reference guidance signals transmitted by the landing aid device 22;

$v_{GLD}$ corresponds to a measurement noise (in DDM) of the current vertical deviation n GLD;

$b_{GLD_{Sensi}}$ corresponds to a sensitivity factor bias of the reference vertical guidance signal (Glide slope) relative to a standardized vertical guidance signal of 0.12 (by the ICAO);

GPA corresponds to an angle (in radians) between the vertical guidance axis defined by the vertical guidance signal (Glide Slope signal) and the landing runway RWY;

$b_{GPA}$ corresponds to the angular alignment bias of the vertical guidance signal (in radians);

$v_{GLD}$ corresponds to a measurement noise (in DDM) of the current vertical deviation $\eta_{GLD}$;

dX corresponds to a distance (in meters) between the threshold T of the landing runway RWY and the transmitter station that transmits the reference vertical guidance signal;

dX can be determined from the following equation: X=TCH/tan (GPA), in which TCH corresponds to the height (in meters) relative to the threshold T of the landing runway RWY at which the vertical deviation is zero (in meters).

$Z_{rwy}$ corresponds to the vertical position of the aircraft AC in the reference frame linked to the landing runway RWY (in meters);

$V_{z_{rwy}}$ corresponds to an unbiased vertical speed of the aircraft AC in the reference frame linked to the landing runway RWY (in m/s).

The second filtering unit 7 can comprise a first updating unit 71 configured to update the lateral position $Y_{rwy}$ of the aircraft AC estimated by the first extended Kalman filter in the reference frame linked to the landing runway RWY using the current lateral position $Y_{rwy}^{GNSS}$ of the aircraft AC in the reference frame linked to the landing runway RWY determined by the second frame changing unit 6.

The second filtering unit 7 can also comprise a second updating unit 72 configured to update the vertical position $Z_{rwy}$ of the aircraft AC estimated by the first extended Kalman filter in the reference frame linked to the landing runway RWY using the current vertical position $Z_{rwy}^{GNSS}$ of the aircraft AC in the reference frame linked to the landing runway RWY determined by the second reference frame changing unit 6.

The determination unit 8 is configured to determine the current lateral deviation DY and the current vertical deviation DZ of the aircraft AC in the reference frame linked to the landing runway RWY, as well as the current lateral speed DVY and the current vertical speed DVZ of the aircraft AC in the reference frame linked to the landing runway RWY from the lateral position $Y_{rwy}$ and the vertical position $Z_{rwy}$ of the aircraft AC, as well as the estimated unbiased speed $(V_n, V_e, V_d)$ in the inertial reference frame.

The current lateral deviation DY is equal to the lateral position $Y_{rwy}$ of the aircraft AC estimated by the first extended Kalman filter in the reference frame linked to the landing runway RWY. The current lateral speed DVY is equal to the lateral speed $V_{y_{rwy}}$ estimated by the first extended Kalman filter in the reference frame linked to the landing runway RWY.

The current vertical deviation DZ of the aircraft AC complies with the following expression:

$$DZ = Z_{rwy} - (X_{rwy} + dX) \cdot \tan(GPA - b_{GPA}).$$

The current vertical speed DVZ of the aircraft AC complies with the following expression:

$DVZ = V_g \cdot \tan(GPA - b_{GPA}) - V_{Z_{rwy}}$, in which:

$V_g$ corresponds to a ground velocity of the aircraft AC. The ground velocity is equal to the following expression: $V_g = \sqrt{(V_e^2 + V_n^2)}$.

The transmission unit 9 is configured to send a user device 10 the current lateral deviation DY and the current vertical deviation DZ of the aircraft AC in the reference frame linked to the landing runway RWY, as well as the current lateral speed DVY and the current vertical speed DVZ of the aircraft AC in the reference frame linked to the landing runway RWY estimated by the second filtering unit 7.

The user device 10 can correspond to an automatic landing system configured to pilot the aircraft AC for landing on the landing runway RWY.

Figure 2:
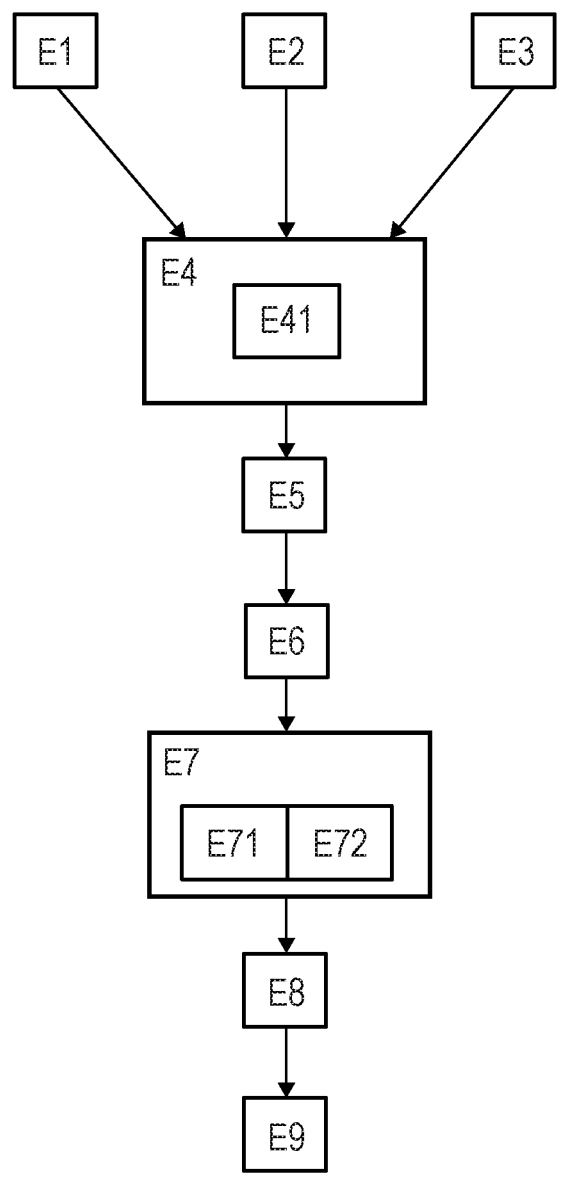
FIG. 2 shows a schematic view of the estimation method.

The invention also relates to a method for estimating (FIG. 2), during an approach procedure for an aircraft AC with a view to landing on a landing runway RWY following a predefined approach to the landing runway RWY, a deviation DY, DZ relative to a reference guidance axis A corresponding to the predefined approach to the landing runway RWY, and a speed DVY, DVZ of an aircraft AC relative to the landing runway RWY, the approach procedure being carried out with the assistance of a landing aid device, the landing aid device comprising at least one transmitter station 22 configured to transmit a reference guidance signal defining the reference guidance axis A.

The estimation method comprises at least the following iteratively repeated steps:

- a first acquisition step E1, implemented by the first acquisition unit 1, for acquiring at least one current position ($lat^{GNSS}$, $lon^{GNSS}$, $h^{GNSS}$) of the aircraft AC determined by a geo-positioning system GNSS;
- a second acquisition step E2, implemented by the second acquisition unit 2, for acquiring current inertial data of the aircraft AC in an inertial reference frame, including at least one current acceleration ($a_n$, $a_e$, $a_z$) determined by an inertial unit IRS;
- a third acquisition step E3, implemented by a third acquisition unit 3, for acquiring a current lateral deviation $\eta_{LOC}$ and a current vertical deviation $\eta_{GLD}$ from the one or more reference guidance signals transmitted by the landing aid device 22;
- a first filtering step E4, implemented by the first filtering unit 4, for estimating, using an extended Kalman filter, an unbiased speed ($V_n$, $V_e$, $V_d$) of the aircraft AC in the inertial reference frame from at least the current position ($lat^{GNSS}$, $lon^{GNSS}$, $h^{GNSS}$) of the aircraft AC acquired in the first acquisition step E1 and the current inertial data of the aircraft AC acquired in the second acquisition step E2;
- a first reference frame changing step E5, implemented by the first reference frame changing unit 5, for determining the unbiased speed ($V_{x_{rwy}}$, $V_{y_{rwy}}$, $V_{z_{rwy}}$) of the aircraft AC in a reference frame linked to the landing runway RWY from the unbiased speed ($V_n$, $V_e$, $V_d$) in the inertial reference frame estimated in the first filtering step E4;
- a second reference frame changing step E6, implemented by the second reference frame changing unit 6, for determining the current position ($X_{rwy}^{GNSS}$, $Y_{rwy}^{GNSS}$, $Z_{rwy}^{GNSS}$) of the aircraft AC in the reference frame linked to the landing runway RWY from the current position ($lat^{GNSS}$, $lon^{GNSS}$, $h^{GNSS}$) acquired in the first acquisition step E1 and from information concerning the location of the landing runway RWY originating from the database, such as the navigation database NAVDB;
- a second filtering step E7, implemented by the second filtering unit 7, for estimating, using at least one extended Kalman filter, a lateral position $Y_{rwy}$ and a vertical position $Z_{rwy}$ of the aircraft AC in the reference frame linked to the landing runway RWY, from the current lateral deviation $\eta_{LOC}$, the current vertical deviation $\eta_{GLD}$, the unbiased speed ($V_{x_{rwy}}$, $V_{y_{rwy}}$, $V_{z_{rwy}}$) in the reference frame linked to the landing runway RWY and from the current position ($X_{rwy}^{GNSS}$, $Y_{rwy}^{GNSS}$, $Z_{rwy}^{GNSS}$) of the aircraft AC in the reference frame linked to the landing runway RWY determined in the second reference frame changing step E6;
- a determination step E8, implemented by the determination unit 8, for determining the current lateral deviation DY and the current vertical deviation DZ of the aircraft AC in the reference frame linked to the landing runway RWY, as well as the current lateral speed DVY and the current vertical speed DVZ of the aircraft AC in the reference frame linked to the landing runway RWY estimated in the second filtering step E6 from the lateral position $Y_{rwy}$ and the vertical position $Z_{rwy}$ of the aircraft AC, as well as from the estimated unbiased speed ($V_n$, $V_e$, $V_d$) in the inertial reference frame;
- a transmission step E9, implemented by the transmission unit 9, for sending a user device 10 the current lateral deviation DY and the current vertical deviation DZ of the aircraft AC in the reference frame linked to the landing runway RWY, as well as the current lateral speed DVY and the current vertical speed DVZ of the aircraft AC in the reference frame linked to the landing runway RWY.

The extended Kalman filter of the first filtering step E4 can have:

- a state vector comprising the estimated unbiased speed ($V_n$, $V_e$, $V_d$) of the aircraft AC in the inertial reference frame, the estimated position (lat, lon, h) of the aircraft AC and an acceleration bias ($ba_n$, $ba_e$, $ba_z$) in the inertial reference frame;
- a measurement vector comprising a position ($lat^{GNSS}$, $lon^{GNSS}$, $h^{GNSS}$) of the aircraft AC determined by the geo-positioning system GNSS in the first acquisition step E1.

The first filtering step E4 can comprise an updating sub-step E41, implemented by the updating unit 41, for updating the estimated position (lat, lon, h) using the current position ($lat^{GNSS}$, $lon^{GNSS}$, $h^{GNSS}$) of the aircraft AC determined by the geo-positioning system GNSS in the first acquisition step E1.

The extended Kalman filter of the first filtering step E4 can implement an evolution model and an observation model as described above for the first filtering unit 4.

The second filtering step E7 can implement a first extended Kalman filter and a second extended Kalman filter as described above for the second filtering unit 7.

The second filtering step E7 can comprise a first updating sub-step E71 implemented by the first updating unit 71 for updating the lateral position $Y_{rwy}$ of the aircraft AC estimated by the first extended Kalman filter in the reference frame linked to the landing runway RWY using the current position $Y_{rwy}^{GNSS}$ of the aircraft AC in the reference frame linked to the landing runway RWY determined in the second reference frame changing step E6.

The second filtering step E7 can comprise a second updating sub-step E72 implemented by the second updating unit 72 for updating the vertical position $Z_{rwy}$ of the aircraft AC estimated by the first extended Kalman filter in the reference frame linked to the landing runway RWY using the current vertical position $Z_{rwy}^{GNSS}$ of the aircraft AC in the reference frame linked to the landing runway RWY determined in the second reference frame changing step E6.

The first extended Kalman filter implemented in the second filtering step E7 can implement an evolution model and an observation model as described above for the second filtering unit 7.

The second extended Kalman filter implemented in the second filtering step E7 can implement an evolution model and an observation model as described above for the second filtering unit 7.

The estimation device S and the estimation method have many advantages.

They enable speed biases to be estimated based on a fusion of measurements from a geo-positioning system GNSS and measurements from an inertial unit IRS. This allows unbiased speeds to be obtained before the approach procedure is carried out with the assistance of a landing aid device ILS in order to:

- be used as input data in the second filtering unit 7;
- be used as input data for the control laws for picking-up the reference guidance signals.

The observation models used in the second filtering unit 7 provide sufficient accuracy for an automatic landing by virtue of introducing the following into the estimation:

two biases $b_{LOC_{Sensi}}$ and $b_{Align}$ linked to the station transmitting the Localizer signal;

two biases $b_{GLD_{Sensi}}$ and $b_{GPA}$ linked to the station transmitting the Glide Slope signal.

Monitoring these estimated values can indicate any erroneous reference guidance signals acquired by the third acquisition unit 3.

In addition, a decentralized architecture for the estimations allows better analysis, monitoring and adjustment to be provided for the various units of the estimation device S.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for estimating, during an approach procedure for an aircraft with a view to landing on a landing runway following a predefined approach to the landing runway, a deviation relative to a reference guidance axis corresponding to the predefined approach to the landing runway, and a speed of the aircraft relative to the landing runway, the approach procedure being carried out assisted by a landing aid device, the landing aid device comprising at least one transmitter station configured to transmit at least one reference guidance signal defining the reference guidance axis, wherein the method is performed by an estimation device comprising at least the following iteratively repeated steps:

acquiring in a first acquisition step, implemented by a first acquisition unit, a current position of the aircraft determined by a geo-positioning system;

acquiring in a second acquisition step, implemented by a second acquisition unit, current inertial data of the aircraft in an inertial reference frame, including at least one current acceleration determined by an inertial unit;

acquiring in a third acquisition step, implemented by a third acquisition unit, a current lateral deviation and a current vertical deviation from the at least one reference guidance signal transmitted by the landing aid device;

estimating in a first filtering step, implemented by a first filtering unit, using an extended Kalman filter, an unbiased speed of the aircraft in the inertial reference frame from at least the current position of the aircraft acquired in the first acquisition step and the current inertial data of the aircraft acquired in the second acquisition step;

determining in a first reference frame changing step, implemented by a first reference frame changing unit, the unbiased speed of the aircraft in a reference frame linked to the landing runway from the unbiased speed in the inertial reference frame estimated in the first filtering step;

determining in a second reference frame changing step, implemented by a second reference frame changing unit, the current position of the aircraft in the reference frame linked to the landing runway from the current position acquired in the first acquisition step and from information concerning a location of the landing runway originating from a database;

estimating in a second filtering step, implemented by a second filtering unit, using at least one extended Kalman filter, a lateral position and a vertical position of the aircraft in the reference frame linked to the landing runway, from the current lateral deviation, the current vertical deviation, the unbiased speed in the reference frame linked to the landing runway and from the current position of the aircraft in the reference frame linked to the landing runway determined in the second reference frame changing step;

determining in a determination step, implemented by a determination unit, the current lateral deviation and the current vertical deviation of the aircraft in the reference frame linked to the landing runway, as well as a current lateral speed and a current vertical speed of the aircraft in the reference frame linked to the landing runway estimated in the second filtering step from a lateral position and the vertical position of the aircraft, as well as from an estimated unbiased speed in the inertial reference frame;

sending in a transmission step, implemented by a transmission unit, to a user device the current lateral deviation and the current vertical deviation of the aircraft in the reference frame linked to the landing runway, as well as the current lateral speed and the current vertical speed of the aircraft in the reference frame linked to the landing runway and for piloting the aircraft for landing on the landing runway.

2. The method as claimed in claim 1, wherein the extended Kalman filter of the first filtering step has:

a state vector comprising the estimated unbiased speed of the aircraft in the inertial reference frame, an estimated position of the aircraft and an acceleration bias in the inertial reference frame;

a measurement vector comprising a position of the aircraft determined by the geo-positioning system in the first acquisition step;

the first filtering step comprising an updating sub-step implemented by an updating unit for updating the estimated position using the current position of the aircraft determined by the geo-positioning system in the first acquisition step, the extended Kalman filter of the first filtering step also having a dynamic evolution model comprising the following equations:

$$dV_n/dt = a_n - 2\Omega_e V_e \sin(lat) + \frac{V_n V_Z}{M(lat)+h} - \frac{V_e^2 \tan(lat)}{N(lat)+h}$$

$$dV_e/dt = a_e + 2\Omega_e(V_n \sin(lat) + V_Z \cos(lat)) + \frac{V_e}{N(lat)+h}(V_Z + V_n \tan(lat))$$

$$dV_d/dt = a_Z - 2\Omega_e V_e \cos(lat) - \frac{V_n^2}{M(lat)+h} - \frac{V_e^2}{N(lat)+h} + g_D$$

$$dlat/dt = \frac{V_n}{M(lat)+h}$$

$$dlon/dt = \frac{V_e}{(N(lat)+h)\cos(lat)}$$

-continued $$\frac{dh}{dt} = -V_d$$

$$dba_n/dt = dba_e/dt = dba_z/dt = 0;$$

and an observation model comprising the following equations:

$$lat^{GNSS} = lat + v_{lat,GNSS}$$

$$lon^{GNSS} = lon + v_{lon,GNSS}$$

$$h^{GNSS} = h + v_{h,GNSS},$$

in which:
$\Omega_e$ corresponds to a rotation speed of the earth;
M corresponds to a meridian radius of curvature;
N corresponds to a radius of curvature of a first vertical of the earth;
$g_d$ corresponds to gravitational acceleration;
lat corresponds to an estimated latitude coordinate of the position of the aircraft in a geographical reference frame;
lon corresponds to an estimated longitude coordinate of the position of the aircraft in the geographical reference frame;
h corresponds to an estimated height coordinate of the position of the aircraft in the geographical reference frame;
$lat^{GNSS}$ corresponds to a latitude coordinate of the position of the aircraft measured by the geo-positioning system in the geographical reference frame;
$lon^{GNSS}$ corresponds to a longitude coordinate of the position of the aircraft measured by the geo-positioning system in the geographical reference frame;
$h^{GNSS}$ corresponds to a height coordinate of the position of the aircraft measured by the geo-positioning system in the geographical reference frame;
$v_{lat,GNSS}$ corresponds to a white noise from the latitude coordinate measured by the geo-positioning system in the geographical reference frame;
$v_{lon,GNSS}$ corresponds to a white noise from the measurement of the longitude coordinate measured by the geo-positioning system in the geographical reference frame;
$v_{h,GNSS}$ Corresponds to a white noise from the measurement of the height coordinate measured by the geo-positioning system in the geographical reference frame;
$a_n$ corresponds to a coordinate of the current acceleration of the aircraft in a Northern direction in the inertial reference frame;
$a_e$ corresponds to a coordinate of the current acceleration of the aircraft in an Eastward direction in the inertial reference frame;
$a_z$ corresponds to a coordinate of the current acceleration of the aircraft in a terrestrial gravity direction in the inertial reference frame;
$ba_n$ corresponds to a coordinate of a bias of the current acceleration of the aircraft in a Northern direction in the inertial reference frame;
$ba_e$ corresponds to a coordinate of the bias of the current acceleration of the aircraft in an Eastward direction in the inertial reference frame;
$ba_z$ corresponds to a coordinate of the bias of the current acceleration of the aircraft in a terrestrial gravity direction in the inertial reference frame;
$V_n$ corresponds to a coordinate of an unbiased speed of the aircraft in a Northern direction in the inertial reference frame;
$V_e$ corresponds to a coordinate of the unbiased speed of the aircraft in an Eastward direction in the inertial reference frame;
$V_z$ corresponds to a coordinate of the unbiased speed of the aircraft in a terrestrial gravity direction in the inertial reference frame.

3. The method as claimed in claim 2, wherein the current position of the aircraft determined by the geo-positioning system and the estimated position of the aircraft from the state vector of the extended Kalman filter of the first filtering step are defined in the geographical reference frame.

4. The method as claimed in claim 1, wherein the second filtering step implements a first extended Kalman filter and a second extended Kalman filter,
   the first extended Kalman filter having:
      a state vector comprising the lateral position of the aircraft in the reference frame linked to the landing runway, an angular alignment bias of a lateral guidance signal supplied by the landing aid device and a sensitivity factor bias of the lateral guidance signal;
      a measurement vector comprising the lateral position in the reference frame linked to the landing runway and a current lateral deviation measured in microamperes from the lateral guidance signal;
   the second extended Kalman filter having:
      a state vector comprising the vertical position in the reference frame linked to the landing runway, an angular alignment bias of a vertical guidance signal supplied by the landing aid device and a sensitivity factor bias of the vertical guidance signal;
      a measurement vector comprising the vertical position in the reference frame linked to the landing runway and a current vertical deviation measured in DDM from the vertical guidance signal;
   the second filtering step comprising a first updating sub-step implemented by a first updating unit for updating the lateral position of the aircraft estimated by the first extended Kalman filter in the reference frame linked to the landing runway using the current position of the aircraft in the reference frame linked to the landing runway determined in the second reference frame changing step;
   the second filtering step comprising a second updating sub-step implemented by a second updating unit for updating the vertical position of the aircraft estimated by the first extended Kalman filter in the reference frame linked to the landing runway using the current vertical position of the aircraft in the reference frame linked to the landing runway determined in the second reference frame changing step;
   the first extended Kalman filter implemented in the second filtering step having a dynamic evolution model comprising the following equations:

$$dY_{rwy}/dt = V_{y_{rwy}}$$

$$db_{LOC_{Sensi}}/dt = db_{Align}/dt = 0,$$

and an observation model comprising the following equation:

$$\eta_{loc} = \frac{L}{0.7 + b_{LOC_{Sensi}}} \cdot \frac{Y_{rwy} - \sin(b_{Align}) \cdot (L - X_{rwy})}{L - X_{rwy}} + v_{loc},$$

in which:
$\eta_{loc}$ corresponds to a current lateral deviation in microamperes acquired from the at least one reference guidance signal transmitted by the landing aid device;
$v_{loc}$ corresponds to a measurement noise of the current lateral deviation;
L corresponds to a distance between a threshold of the landing runway and the transmitter station that transmits the reference lateral guidance signal;
$b_{LOC_{Sensi}}$ corresponds to a sensitivity factor bias of the reference lateral guidance signal relative to a standardized reference lateral signal of 0.7;
$b_{Align}$ corresponds to the angular alignment bias of the lateral guidance signal;
$X_{rwy}$ corresponds to a longitudinal position of the aircraft in the reference frame linked to the landing runway;
$Y_{rwy}$ corresponds to a lateral position of the aircraft in the reference frame linked to the landing runway;
$V_{y_{rwy}}$ corresponds to an unbiased lateral speed of the aircraft in the reference frame linked to the landing runway;
the second extended Kalman filter implemented in the second filtering step having a dynamic evolution model comprising the following equations:

$$dZ_{rwy}/dt = v_{z_{rwy}}$$

$$db_{GLD_{Sensi}}/dt = db_{GPA}/dt = 0,$$

and an observation model comprising the following equation:

$$\eta_{GLD} = \frac{0.0875}{(GPA - b_{GPA}) \cdot (0.12 - b_{GLD_{Sensi}})} \cdot \left( \mathrm{atan}\left(\frac{Zrwy}{X_{rwy} + dX}\right) - (GPA - b_{GPA}) \right) + v_{GLD},$$

in which:
$\eta_{GLD}$ corresponds to a current vertical deviation in DDM acquired from the at least one reference guidance signal transmitted by the landing aid device;
$v_{GLD}$ corresponds to a measurement noise of the current vertical deviation;
$b_{LOC_{Sensi}}$ corresponds to a sensitivity factor bias of the reference vertical guidance signal relative to a standardized vertical guidance signal of 0.12;
GPA corresponds to an angle between the vertical guidance axis defined by the vertical guidance signal and the landing runway;
$b_{GPA}$ corresponds to the angular alignment bias of the vertical guidance signal;
$v_{GLD}$ corresponds to a measurement noise of the current vertical deviation;
dX corresponds to a longitudinal distance between the threshold of the landing runway and the transmitter station that transmits the reference vertical guidance signal;

$Z_{rwy}$ corresponds to the vertical position of the aircraft in the reference frame linked to the landing runway;
$V_{z_{rwy}}$ corresponds to an unbiased vertical speed of the aircraft in the reference frame linked to the landing runway.

5. The method as claimed in claim 1,
wherein the current lateral deviation is equal to the lateral position of the aircraft estimated by the first extended Kalman filter in the reference frame linked to the landing runway, the current lateral speed is equal to the lateral speed estimated by the first extended Kalman filter in the reference frame linked to the landing runway, and
wherein the current vertical deviation of the aircraft complies with the following expression:

$$DZ = Z_{rwy} - (X_{rwy} + dX) \cdot \tan(GPA - b_{GPA}),$$

with the current vertical speed of the aircraft complying with the following expression:

$$DVZ = V_g \cdot \tan(GPA - b_{GPA}) - V_{Z_{rwy}}.$$

6. The method as claimed in claim 1, wherein the current position of the aircraft determined by the geo-positioning system and the estimated position of the aircraft from the state vector of the extended Kalman filter of the first filtering step are expressed as pseudo-range.

7. An estimation device for estimating, during an approach procedure for an aircraft with a view to landing on a landing runway following a predefined approach to said landing runway, a deviation relative to a reference guidance axis corresponding to said predefined approach to the landing runway, and a speed of an aircraft relative to the landing runway, the approach procedure being carried out with the assistance of a landing aid device, the landing aid device comprising at least one transmitter station configured to transmit a reference guidance signal defining the reference guidance axis, wherein the estimation device comprises:
a first acquisition unit configured to acquire at least one current position of the aircraft determined by a geo-positioning system;
a second acquisition unit configured to acquire current inertial data of the aircraft in an inertial reference frame, including at least one current acceleration determined by an inertial unit;
a third acquisition unit configured to acquire a current lateral deviation and a current vertical deviation from the at least one reference guidance signal transmitted by the landing aid device;
a first filtering unit configured to estimate, using an extended Kalman filter, an unbiased speed of the aircraft in the inertial reference frame from at least the current position of the aircraft acquired by the first acquisition unit and the current inertial data of the aircraft acquired by the second acquisition unit;
a first reference frame changing unit configured to determine the unbiased speed of the aircraft in a reference frame linked to the landing runway from the unbiased speed in the inertial reference frame estimated by the first filtering unit;
a second reference frame changing unit configured to determine the current position of the aircraft in the reference frame linked to the landing runway from the current position acquired by the first acquisition unit and from information concerning the location of the landing runway originating from a database;

a second filtering unit configured to estimate, using at least one extended Kalman filter, a lateral position and a vertical position of the aircraft in the reference frame linked to the landing runway, from the current lateral deviation, the current vertical deviation, the unbiased speed in the reference frame linked to the landing runway and from the current position of the aircraft in the reference frame linked to the landing runway determined by the second reference frame changing unit;

a determination unit configured to determine the current lateral deviation and the current vertical deviation of the aircraft in the reference frame linked to the landing runway, as well as the current lateral speed and the current vertical speed of the aircraft in the reference frame linked to the landing runway estimated by the second filtering unit from the lateral position and the vertical position of the aircraft, as well as from the estimated unbiased speed in the inertial reference frame; and a transmission unit configured to send a user device the current lateral deviation and the current vertical deviation of the aircraft in the reference frame linked to the landing runway, as well as the current lateral speed and the current vertical speed of the aircraft in the reference frame linked to the landing runway and for piloting the aircraft for landing on the landing runway.

8. An aircraft comprising:

an estimation device for estimating, during an approach procedure for an aircraft with a view to landing on a landing runway following a predefined approach to said landing runway, a deviation relative to a reference guidance axis corresponding to said predefined approach to the landing runway, and a speed of an aircraft relative to the landing runway, the approach procedure being carried out with the assistance of a landing aid device, the landing aid device comprising at least one transmitter station configured to transmit a reference guidance signal defining the reference guidance axis, wherein the estimation device comprises:

a first acquisition unit configured to acquire at least one current position of the aircraft determined by a geo-positioning system;

a second acquisition unit configured to acquire current inertial data of the aircraft in an inertial reference frame, including at least one current acceleration determined by an inertial unit;

a third acquisition unit configured to acquire a current lateral deviation and a current vertical deviation from the at least one reference guidance signal transmitted by the landing aid device;

a first filtering unit configured to estimate, using an extended Kalman filter, an unbiased speed of the aircraft in the inertial reference frame from at least the current position of the aircraft acquired by the first acquisition unit and the current inertial data of the aircraft acquired by the second acquisition unit; a first reference frame changing unit configured to determine the unbiased speed of the aircraft in a reference frame linked to the landing runway from the unbiased speed in the inertial reference frame estimated by the first filtering unit; a second reference frame changing unit configured to determine the current position of the aircraft in the reference frame linked to the landing runway from the current position acquired by the first acquisition unit and from information concerning the location of the landing runway originating from a database; a second filtering unit configured to estimate, using at least one extended Kalman filter, a lateral position and a vertical position of the aircraft in the reference frame linked to the landing runway, from the current lateral deviation, the current vertical deviation, the unbiased speed in the reference frame linked to the landing runway and from the current position of the aircraft in the reference frame linked to the landing runway determined by the second reference frame changing unit; a determination unit configured to determine the current lateral deviation and the current vertical deviation of the aircraft in the reference frame linked to the landing runway, as well as the current lateral speed and the current vertical speed of the aircraft in the reference frame linked to the landing runway estimated by the second filtering unit from the lateral position and the vertical position of the aircraft, as well as from the estimated unbiased speed in the inertial reference frame; and a transmission unit configured to send a user device the current lateral deviation and the current vertical deviation of the aircraft in the reference frame linked to the landing runway, as well as the current lateral speed and the current vertical speed of the aircraft in the reference frame linked to the landing runway.

\* \* \* \* \*